(12) United States Patent
Nishihara et al.

(10) Patent No.: US 8,289,487 B2
(45) Date of Patent: Oct. 16, 2012

(54) LIQUID CRYSTAL DISPLAY

(75) Inventors: Yusuke Nishihara, Osaka (JP); Akihiro Yamamoto, Osaka (JP); Masumi Kubo, Osaka (JP); Kenji Okamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 361 days.

(21) Appl. No.: 12/447,336

(22) PCT Filed: Jun. 25, 2007

(86) PCT No.: PCT/JP2007/062711
§ 371 (c)(1),
(2), (4) Date: Apr. 27, 2009

(87) PCT Pub. No.: WO2008/053615

PCT Pub. Date: May 8, 2008

(65) Prior Publication Data

US 2010/0073606 A1  Mar. 25, 2010

(30) Foreign Application Priority Data

Oct. 31, 2006  (JP) ................................. 2006-296399

(51) Int. Cl.
*G02F 1/1343* (2006.01)
(52) U.S. Cl. ......................... 349/139; 349/144; 349/143
(58) Field of Classification Search .................. 349/139, 349/144, 143
See application file for complete search history.

(56) References Cited

U.S. PATENT DOCUMENTS

| 5,477,351 | A | * | 12/1995 | Takahara et al. .................. 349/5 |
| 6,424,397 | B1 | * | 7/2002 | Kuo .............................. 349/139 |
| 6,661,488 | B1 | | 12/2003 | Takeda et al. |
| 6,897,918 | B1 | * | 5/2005 | Nonaka et al. ................ 349/106 |
| 7,812,893 | B2 | * | 10/2010 | Yagi et al. ........................ 349/39 |
| 2005/0046772 | A1 | * | 3/2005 | Kubo et al. .................... 349/139 |
| 2005/0088597 | A1 | | 4/2005 | Maeda et al. |
| 2005/0237463 | A1 | * | 10/2005 | Kubo ............................. 349/139 |
| 2006/0158574 | A1 | * | 7/2006 | Kubo et al. ..................... 349/38 |
| 2006/0244883 | A1 | * | 11/2006 | Okumura ...................... 349/114 |

(Continued)

FOREIGN PATENT DOCUMENTS

| JP | 2005-284025 | | 10/2005 |
| JP | 2006-251565 | | 9/2006 |
| JP | 2007-171577 | * | 7/2007 |
| WO | WO2006054386 | * | 5/2006 |

OTHER PUBLICATIONS

International Preliminary Report on Patentability mailed May 14, 2009 in corresponding PCT Application No. PCT/JP2007/062711.
International Search Report for PCT/JP2007/062711, mailed Aug. 21, 2007.

*Primary Examiner* — Edward Glick
*Assistant Examiner* — Sang Nguyen
(74) *Attorney, Agent, or Firm* — Nixon & Vanderhye P.C.

(57) ABSTRACT

An MVA-type LCD capable of displaying with a high contrast ratio is provided. An LCD according to the present invention is an MVA-type LCD including a stripe-shaped rib 21b provided on a first electrode 11 of a liquid crystal layer and a stripe-shaped slit 22 formed in a second electrode 12 of the liquid crystal layer. The rib 21b has a side face whose taper angle in a cross section which is orthogonal to an azimuth direction that the rib 21 extends is 18° or less, and is made of a material such that a film of the material with a thickness corresponding to the height of the rib has an OD value of 0.8 or more.

10 Claims, 10 Drawing Sheets

U.S. PATENT DOCUMENTS

| | | | |
|---|---|---|---|
| 2006/0275560 A1* | 12/2006 | Fukagawa et al. | 428/1.31 |
| 2007/0126973 A1* | 6/2007 | Ikeda et al. | 349/155 |
| 2007/0229733 A1* | 10/2007 | Suh et al. | 349/96 |
| 2007/0258026 A1* | 11/2007 | Sumi | 349/106 |
| 2009/0009695 A1* | 1/2009 | Ito | 349/96 |
| 2009/0153758 A1* | 6/2009 | Tsubata et al. | 349/38 |

* cited by examiner

FIG.6
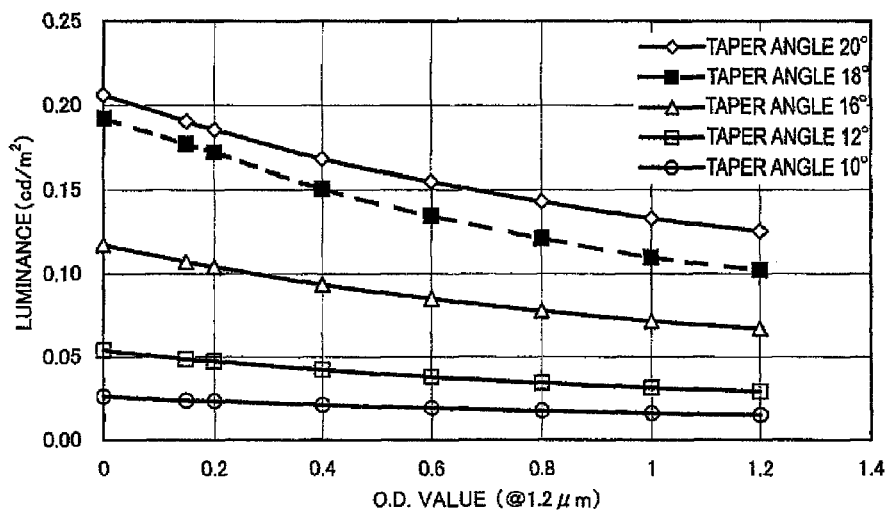
FIG.7
(a)
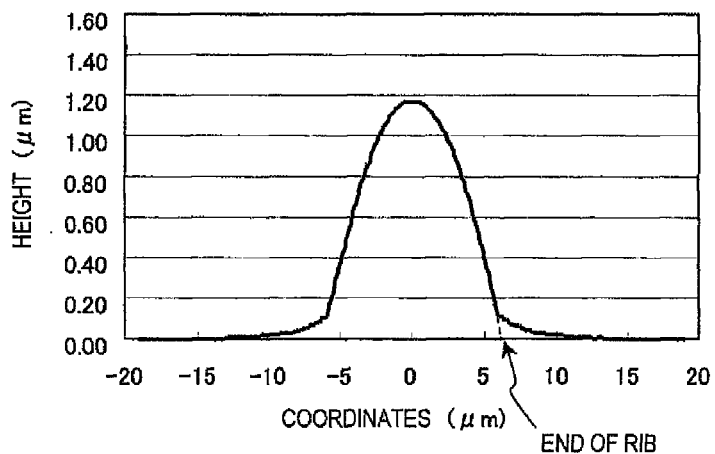
(b)
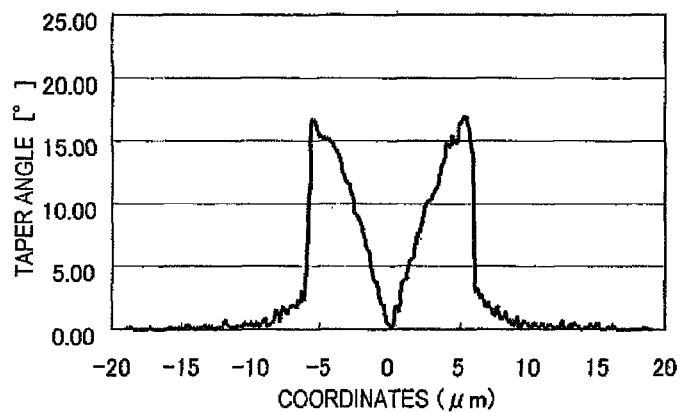

FIG.9
(a)
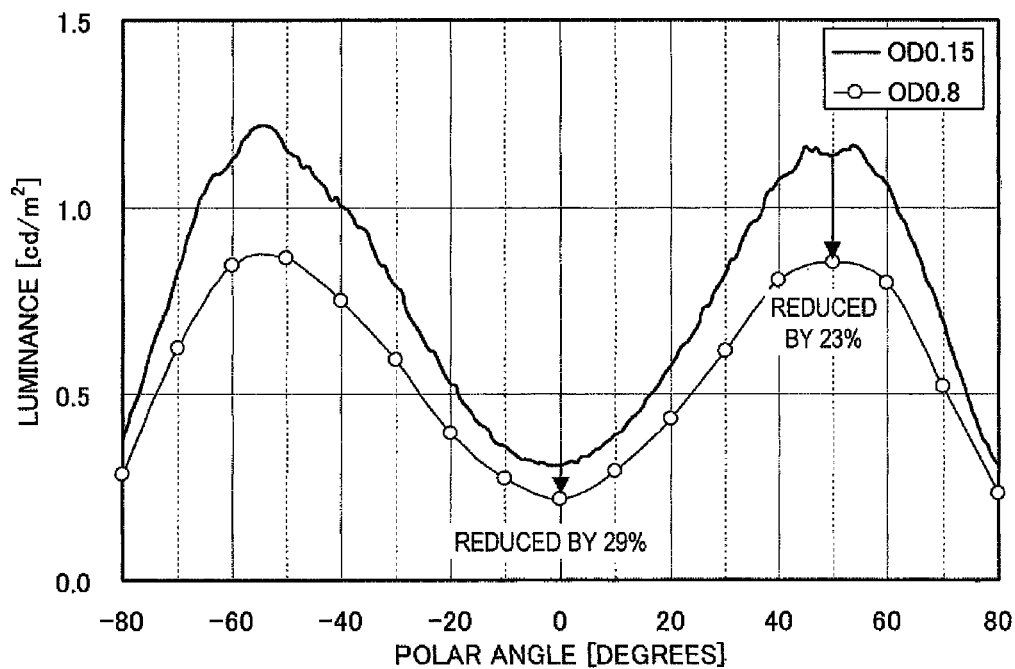
(b)
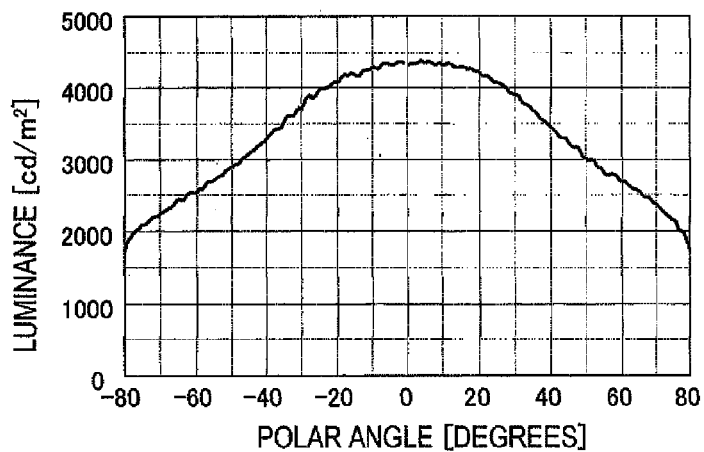

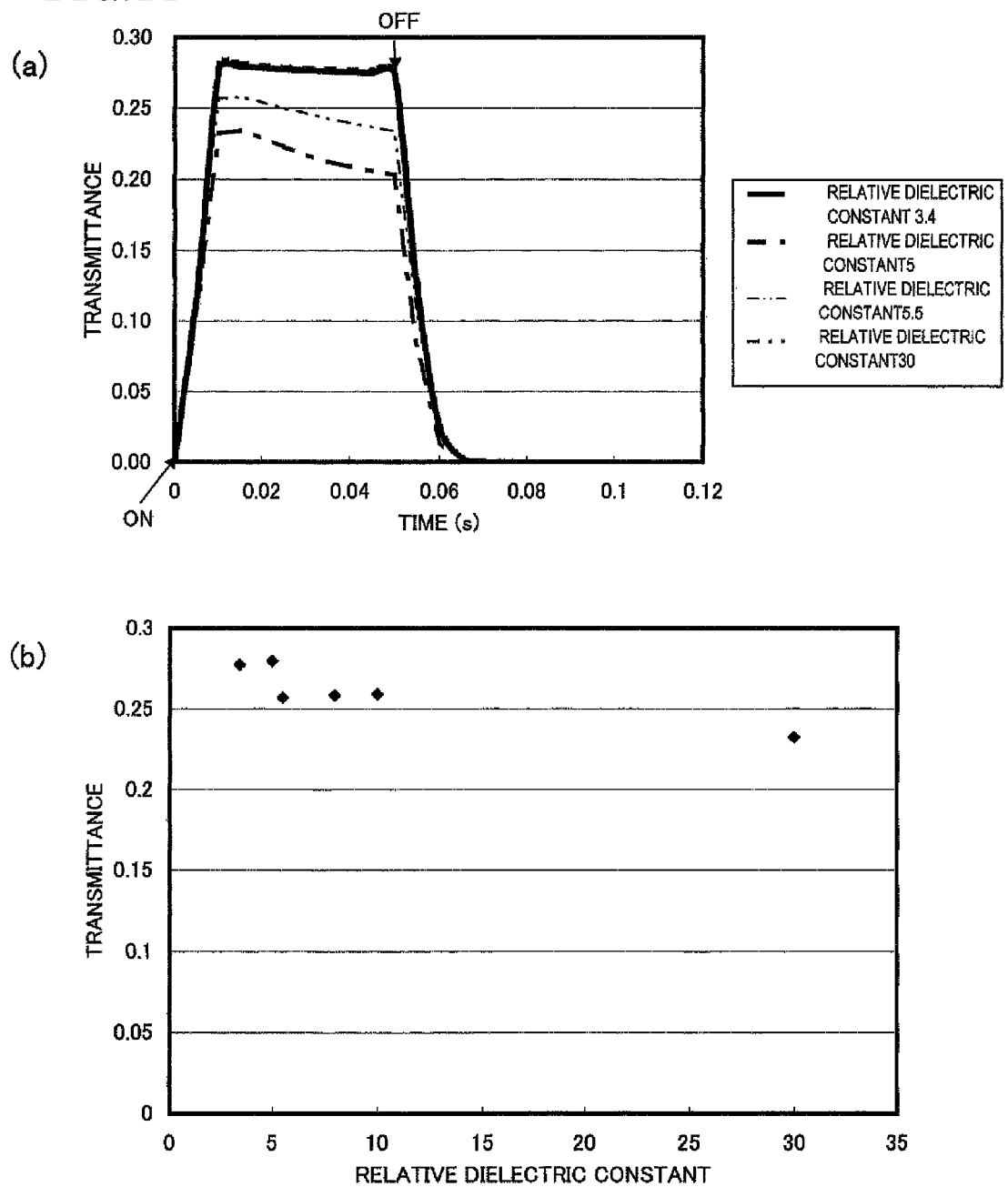

LIQUID CRYSTAL DISPLAY

This application is the U.S. national phase of International Application No. PCT/JP2007/062711 filed 25 Jun. 2007, which designated the U.S. and claims priority to Japan Application No, 2006-296399 filed 31 Oct. 2006, the entire contents of each of which are hereby incorporated by reference.

TECHNICAL FIELD

The present invention relates to a liquid crystal display device, and more particularly to a liquid crystal display device having a high contrast ratio which is suitable for use in a liquid crystal television set.

BACKGROUND ART

In recent years, liquid crystal television sets incorporating liquid crystal display devices (hereinafter referred to as "LCDs") are rapidly gaining prevalence. Since LCDs for liquid crystal television sets are required to have high viewing angle characteristics, the following two types are mainly prevalent: IPS-type and MVA-type. As compared to the IPS-type, the MVA-type has advantages such as excellent mass producibility and high black display quality, and enjoys a market share which is much greater than that of the IPS-type.

As is described in Patent Document 1, an MVA-type LCD is an LCD which performs displaying in the normally black (NB) mode by using a vertical-alignment type liquid crystal layer that is provided between a pair of electrodes, with domain regulating means being provided so that, under an applied voltage, liquid crystal molecules will fall (tilt) in a plurality of different directions within each pixel. The domain regulating means are, for example, slits which are formed in an electrode or ribs (also referred to as protrusions or bumps) which are formed on an electrode and protrude toward the liquid crystal layer. Although various combinations are possible for the domain regulating means to be provided on both sides of the liquid crystal layer, the following description assumes that the MVA-type LCD refers to a construction which the Applicants currently adopt as the LCDs for large-sized liquid crystal television sets, i.e., a construction where slits are provided in one of a pair of electrodes sandwiching a liquid crystal layer and ribs are provided on the other electrode, unless otherwise specified.

[Patent Document 1] The specification of Japanese Patent No. 2947350

DISCLOSURE OF INVENTION

Problems to be Solved by the Invention

The liquid crystal television sets which are currently marketed by the Applicants have contrast ratios above 1000, but an even higher contrast is being desired. Therefore, in order to further reduce the luminance in a black displaying state (hereinafter simply referred to as the "black luminance"), the inventors have specifically studied what is boosting the black luminance. As a result, it has been found that, in addition to a leakage of light which is caused by disturbed polarization due to color filters, a leakage of light near the side faces of ribs and the like are boosting the black luminance.

An objective of the present invention is to provide an MVA-type LCD that is capable of displaying with a high contrast ratio, in which a leakage of light near the side faces of the ribs and the like are suppressed.

Means for Solving the Problems

A liquid crystal display device comprises a plurality of pixels each including a first electrode, a second electrode opposing the first electrode, and a vertical-alignment type liquid crystal layer provided between the first electrode and the second electrode, characterized in that, each of the plurality of pixels includes: a stripe-shaped rib provided on the first electrode on the liquid crystal layer and a stripe-shaped slit formed in the second electrode on the liquid crystal layer; when a voltage is applied across the liquid crystal layer, a liquid crystal domain is formed such that an azimuth direction of tilting of liquid crystal molecules in a region between the rib and the slit is orthogonal to an azimuth direction that the rib and the slit extend; and the rib has a side face whose taper angle in a cross section which is orthogonal to an azimuth direction that the rib extends is 18° or less, and is made of a material such that a film of the material with a thickness corresponding to a height of the rib has an OD value of 0.8 or more.

In one embodiment, a relative dielectric constant $\in$ of a material of the rib is smaller than an average relative dielectric constant $\in_{av}$ of the liquid crystal material.

In one embodiment, the rib contains a blue pigment and a red pigment.

In one embodiment, a pair of polarizers placed in crossed Nicols are comprised, wherein the rib includes a first portion and a second portion extending in azimuth directions which are substantially 90° apart, each of the first portion and the second portion bisecting an angle between transmission axes of the pair of polarizers.

In one embodiment, the second substrate includes a wiring line in a region corresponding to each of the plurality of pixels, the wiring line being made of a material containing a metal; and the wiring line extends in an azimuth direction which is parallel or orthogonal to the transmission axes of the pair of polarizers.

In one embodiment, the second substrate includes a wiring line in a region corresponding to each of the plurality of pixels, the wiring line being made of a material containing a metal; and the wiring line is disposed so as to overlap the rib when viewed from a normal direction of the liquid crystal layer.

In one embodiment, a width of the wiring line is narrower than a width of the rib.

In one embodiment, a TFT connected to the second electrode and a storage capacitor are included, wherein, the wiring line is connected to a drain of the TFT or one of a plurality of electrodes constituting the storage capacitor.

In one embodiment, a depolarization ability of the color filter is defined by the expression: depolarization ability=color filter (CN)–polarizer (CN)×[color filter (PN)/polarizer (PN)] (where "color filter (CN)" represents a luminance when a pair of polarizers sandwiching a color filter substrate are placed in crossed Nicols (CN); "color filter (PN)" represents a luminance when a pair of polarizers sandwiching a color filter substrate are placed in parallel Nicols (PN); polarizer (CN) represents a luminance with only a pair of polarizers placed in crossed Nicols (CN); and polarizer (PN) represents a luminance with only a pair of polarizers placed in parallel Nicols (PN)); and a depolarization ability as converted to white luminance, which is a value of the depolarization ability as converted under an assumption that a luminance of a pair of polarizers placed in parallel Nicols is 500 cd/m², is 0.05 cd/m² or less.

Effects of the Invention

In an MVA-type LCD according to the present invention, a rib has a side face whose taper angle in a cross section which is orthogonal to the azimuth direction that the rib extends is 18° or less, and is made of a material such that a film of the material with a thickness corresponding to the height of the rib has an OD value of 0.8 or more. Thus, the MVA-type LCD according to the present invention is capable of displaying with a high contrast ratio.

BRIEF DESCRIPTION OF DRAWINGS

FIG. 6 A graph showing a relationship between the taper angle of ribs, the OD value, and the amount of light leakage (luminance) from ribs.

FIG. 7(a) is a diagram showing an example of an actually-measured cross-sectional profile of a rib; and (b) is a diagram showing a taper angle as determined from the cross-sectional profile of (a).

FIG. 9(a) is a graph for explaining an influence of the OD of ribs on the luminance of a liquid crystal display device in a black displaying state, where the horizontal axis represents polar angle and the vertical axis represents luminance; and (b) is a graph showing an angular distribution of outgoing light from a direct type backlight.

FIG. 14(a) is a graph showing the change over time of transmittance of a pixel after a white displaying voltage is applied across the liquid crystal layer in a black displaying state; and (b) is a graph showing a relationship between the highest transmittance and the relative dielectric constant of the ribs.

DESCRIPTION OF REFERENCE NUMERALS

| | |
|---|---|
| 11 | first electrode (counter electrode) |
| 12 | second electrode (pixel electrode) |
| 13 | liquid crystal layer |
| 13A | liquid crystal region |
| 13a | liquid crystal molecule |
| 21 | rib |
| 21s | slanted side face of rib |
| 21a | rib (OD value = 0.15) |
| 21b | rib (OD value = 0.8) |
| 22 | slit |
| 23 | black matrix |
| 24a | CS line |
| 25 | drain lead line |
| 26 | contact hole |

BEST MODE FOR CARRYING OUT THE INVENTION

With reference to the drawings, the construction of an MVA-type LCD according to an embodiment of the present invention will be described in detail.

First, with reference to FIG. 1, the fundamental construction and operation of the MVA-type LCD according to the embodiment of the present invention will be described.

Figure 1:
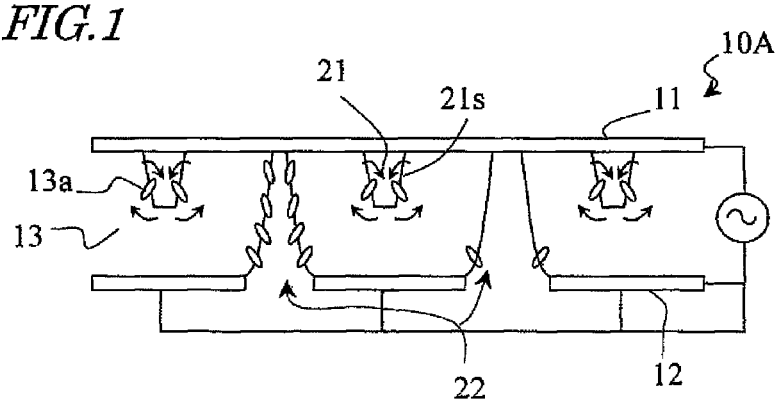
FIG. 1 A cross-sectional view schematically showing an exemplary fundamental construction of an MVA-type LCD according to an embodiment of the present invention.

The MVA-type LCD 10A shown in FIG. 1 includes a plurality of pixels having a first electrode 11, second electrodes 12 opposing the first electrode 11, and a vertical-alignment type liquid crystal layer 13 provided between the first electrode 11 and the second electrodes 12. In the vertical-alignment type liquid crystal layer 13, under no applied voltage, liquid crystal molecules having a negative dielectric anisotropy are aligned substantially perpendicular (e.g. no less than 87° and no more than 90° to the planes of the first electrode 11 and the second electrodes 12. Typically, it is obtained by providing a vertical alignment film (not shown) on a surface, on the liquid crystal layer 13 side, of each of the first electrode 11 and the second electrodes 12. Note that, in the case where ribs are provided as domain regulating means, the liquid crystal molecules will be aligned substantially perpendicular to the surface of ribs on the liquid crystal layer side.

On the first electrode 11 on the liquid crystal layer 13, ribs 21 are provided as first domain regulating means. On the second electrodes 12 on the liquid crystal layer 13, slits (apertures, or portions where the conductive layer does not exist) 22 are provided as second domain regulating means. In a liquid crystal region which is defined between a first domain regulating means and a second domain regulating means, liquid crystal molecules 13a are subject to orientation regulating forces from the rib 21 and slit 22, and when a voltage is applied between the first electrode 11 and the second electrode 12, they fall (tilt) in a direction shown by arrows in the figure. Since the liquid crystal molecules will fall in a uniform azimuth direction within each liquid crystal region, each liquid crystal region can be regarded as a domain.

Within each pixel, the ribs 21 and slits 22 are each provided in a stripe (linear) shape; FIG. 1 is a cross-sectional view along a direction (azimuth direction) which is orthogonal to the direction that the stripe-shaped domain regulating means extend (extending azimuth direction). On both sides of each of the ribs 21 and slits 22, liquid crystal regions (domains) are formed in which the liquid crystal molecules 13a fall in azimuth directions which are 180° apart. As used herein, an "azimuth direction" means a direction within the display plane of the LCD (i.e., in the layer plane of the liquid crystal layer), and is typically represented by an azimuth angle such that the three o'clock direction on a clock face, which is the display plane, is 0°.

The ribs 21 of the LCD 10A cause the liquid crystal molecules 13a to be oriented substantially perpendicular to the tilted side faces 21s thereof, so that the liquid crystal molecules 13a are oriented in an azimuth direction which is orthogonal to the extending azimuth direction of the ribs 21. When a potential difference is created between the first electrode 11 and the second electrode 12, each slit 22 generates an oblique electric field in the liquid crystal layer 13 near the edges of the slit 22, thus causing the liquid crystal molecules 13a to be oriented in azimuth directions orthogonal to the extending azimuth direction of the slit 22. The ribs 21 and the slits 22 are disposed parallel to one another, with a constant interval therebetween, so that a liquid crystal region (domain) is formed between every adjoining rib 21 and slit 22.

Generally speaking, a first electrode 11 and a second electrode 12 may be any electrodes that oppose each other via the liquid crystal layer 13. In a typical TFT—type LCD, one of them is a counter electrode, whereas the other is a pixel electrode. Hereinafter, the embodiment of the present invention will be described with respect to a case where the first electrode 11 is a counter electrode and the second electrodes 12 are pixel electrodes. When this construction is adopted, an advantage is obtained in that the increase in the production steps can be minimized. Providing slits in the pixel electrodes does not require any additional steps. On the other hand, as for the counter electrode, provide ribs will induce a smaller increase in the number of steps than providing slits.

Figure 2:
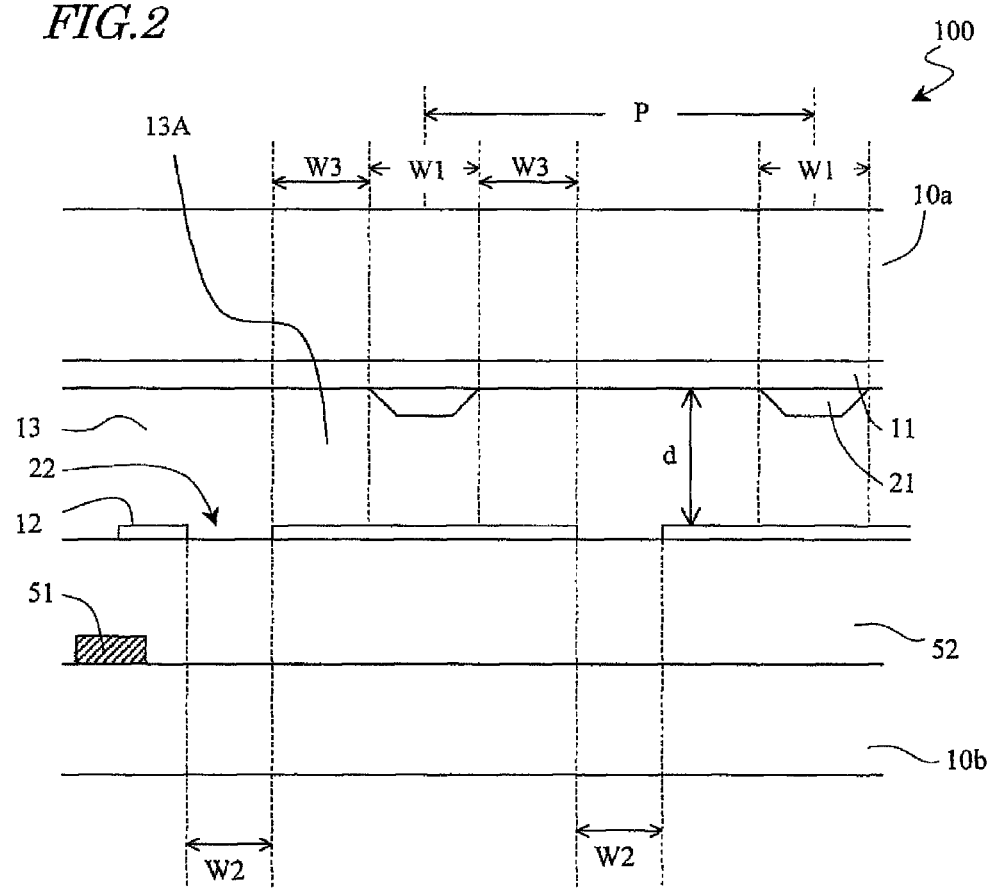
FIG. 2 A partial cross-sectional view schematically showing a cross-sectional structure of an LCD 100 according to an embodiment of the present invention.
Figure 3:
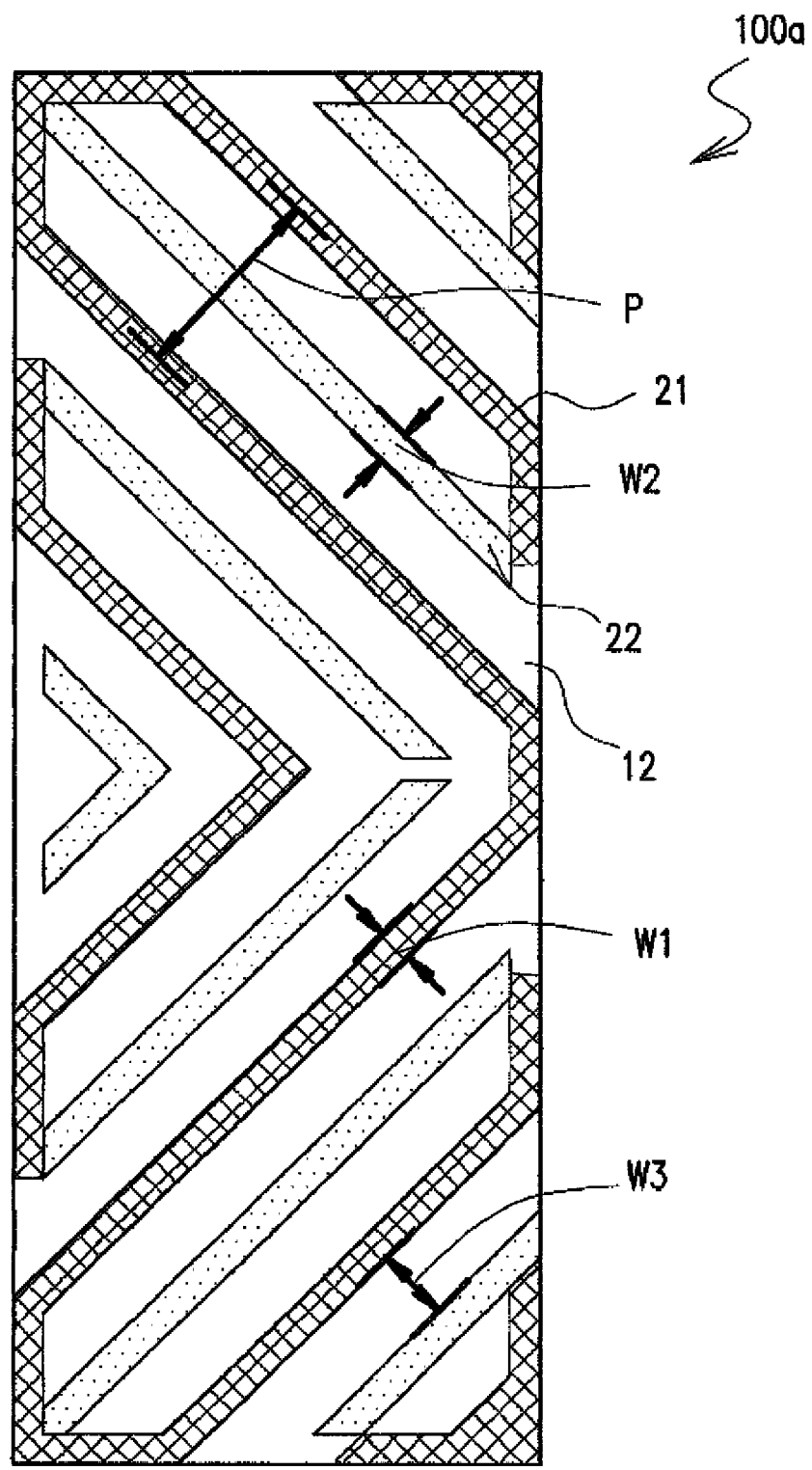
FIG. 3 A schematic plan view showing a pixel portion 100a of the LCD 100.

Next, with reference to FIG. 2 and FIG. 3, the construction of the MVA-type LCD according to the embodiment of the present invention will be described more specifically. FIG. 2 is a partial cross-sectional view schematically showing a cross-sectional structure of the MVA-type LCD 100 of the embodiment, and FIG. 3 is a plan view of a pixel portion 100a of the LCD 100. Since the LCD 100 has a similar fundamental construction to that of the LCD 10A in FIG. 1, common constituent elements will be denoted by like reference numerals.

The LCD 100 includes the vertical-alignment type liquid crystal layer 13 between a first substrate (e.g. a glass substrate) 10a and a second substrate (e.g. a glass substrate) 10b. On the surface of the first substrate 10a facing the liquid crystal layer 13, the counter electrode 11 is formed and the ribs 21 are formed further thereupon. A vertical alignment film (not shown) is formed on essentially the entire surface of the counter electrode 11 on the liquid crystal layer 13 side, including the ribs 21. As shown in FIG. 3, the ribs 21 extend in stripe shapes; adjoining ribs are disposed parallel to each other, with a constant interval (pitch) P therebetween; and the width (width in the azimuth direction orthogonal to the extending azimuth direction) W1 of the ribs 21 is also constant.

On the surface of the second substrate (e.g. glass substrate) 10b on the liquid crystal layer 13 side, gate bus lines (scanning lines) and source bus lines (signal lines) 51 and TFTs (not shown) are provided, and an interlayer insulating film 52 of a transparent resin film covering them is formed. The pixel electrodes 12 are formed on the interlayer insulating film 52.

Herein, an interlayer insulating film 52 having a flat surface is provided by using a transparent resin film with a thickness of no less than 1.5 µm and no more than 3.5 µm. This makes it possible for the pixel electrodes 12 to be partially overlaid on the gate bus lines and/or the source bus lines, whereby an advantage of improving the aperture ratio is provided. Instead, by adopting a construction where the interlayer insulating film 52 is formed by using an inorganic thin film (e.g. a silicon oxide film) with a thickness less than 1.5 µm, an advantage will be provided in that storage capacitors can be formed in peripheral portions of the pixel electrodes 12 by utilizing the interlayer insulating film 52, for example.

Stripe-shaped slits 22 are formed in the pixel electrodes 12, and a vertical alignment film (not shown) is formed on essentially the entire surface of the pixel electrodes 12, including the slits 22. The slits 22 are provided so as to extend in stripe shapes as shown in FIG. 3; adjoining slits 22 are disposed parallel to each other, so as to substantially bisect the interval between adjoining ribs 21. The width W2 (the width in an azimuth direction which is orthogonal to the extending azimuth direction) of each slit 22 is constant.

Between the stripe-shaped ribs 21 and slits 22 extending in parallel to one another, stripe-shaped liquid crystal regions 13A having a width W3 are defined. Each liquid crystal region 13A is restricted in terms of orientation azimuth direction by the rib 21 and slit 22 on both sides thereof. Thus, on both sides of each of the rib 21 and slit 22, liquid crystal regions (domains) are formed in which liquid crystal molecules 13a fall in azimuth directions which are 180° apart. In the LCD 100, as shown in FIG. 3, each of the rib 21 and slit 22 has portions extending in two azimuth directions which are 90° apart. Thus, the pixel portion 100a includes four liquid crystal regions 13A, the orientation azimuth directions of whose liquid crystal molecules 13a are 90° apart. The extending azimuth directions of the ribs 21 and the slits 22 are set to azimuth directions such that the angle between the transmission axes of the pair of polarizers which are placed in crossed Nicols is bisected by each. Although the positioning of the ribs 21 and slits 22 is not limited to this example, this positioning will provide good viewing angle characteristics. Note that, as shown in FIG. 3, in addition to portions extending in parallel to the slits 22, each rib 21 includes portions which are parallel to the edge portions of the pixel electrodes 12. These portions of the ribs 21 are intended to prevent the orientations of the liquid crystal molecules from being disturbed by oblique electric fields from the edge portions of the pixel electrodes 12, and may be omitted.

The shapes and positioning of the aforementioned slits and ribs may deviate from the design values under the influences of variations in the production process, positioning tolerance when attaching the substrates, etc., and the above description is not exclusive of such situations. Although the ribs 21 and slits 22 typically have a constant width as described above, each slit 22 may locally have a portion with a narrowed width W2, for example, in order to stabilize the orientations of the liquid crystal molecules. Inside the slits 22, the orientation azimuth directions of the liquid crystal molecules are not constant, and disclinations may occur. However, by providing portions with a narrowed width W2 here and there in the slits 22, the disclinations can be fixed, thus stabilizing the orientations of the liquid crystal molecules.

In the LCD 100, the pair of polarizers (not shown) which are provided on both sides of the first substrate 10a and the second substrate 10b are disposed so that their transmission axes are substantially orthogonal to each other (crossed-Nicols state). By placing the polarizers so that their transmission axes constitute 45° with respect to each orientation azimuth direction of all of the four liquid crystal regions 13A whose orientation azimuth directions are 90° apart, changes in retardation caused by the liquid crystal region 13A can be utilized most efficiently. In other words, the polarizers are preferably disposed so that their transmission axes constitute substantially 45° with respect to the extending azimuth directions of the ribs 21 and slits 22. Moreover, in the case of a display apparatus for which the viewing direction is likely to be moved horizontally with respect to the display plane, e.g., a television set, it is preferable that the transmission axis of one of the pair of polarizers is in a horizontal direction (3 o'clock-9 o'clock) with respect to the display plane, this being in order to suppress the viewing angle dependence of display quality.

In the above-described MVA-type LCD 100 according to the embodiment of the present invention, each rib 21 includes side faces having a taper angle (θ) of 18° or less in a cross section which is orthogonal to the azimuth direction that the rib extends, and is made of a material such that a film of a thickness that corresponds to the height of a rib has an OD value of 0.8 or more (a rib having an OD value of 0.8 or more may be referred to as a light-shielding rib). Thus, as a result of suppressing leakage of light near the side faces of the ribs 21, the contrast ratio can be increased. The taper angle is preferably 12° or more, and the OD value is preferably 1.2 or less. As is well known, an OD value is expressed as $-\log I/I_0$, where $I_0$ is an incident light amount and I is a transmitted light amount. As the OD value increases, the transmitted light amount decreases. In the following, a case will be illustrated where the rib height is 1.2 μm; unless otherwise specified, the OD value of a film having a thickness of 1.2 μm will be referred to as the OD value of the material of the ribs. It will be appreciated that, in the case where ribs having any height which is greater or less than 1.2 μm, the OD value at a film thickness corresponding to that height should satisfy the aforementioned condition. Although the height of the ribs depends on the thickness (no less than 3.2 μm and no more than 3.6 μm) of the liquid crystal layer, it is preferably 1.0 μm or more in order to allow a sufficient orientation regulating force to be exhibited, and preferably 1.3 μm or less from the standpoint of black display quality.

Figure 4:
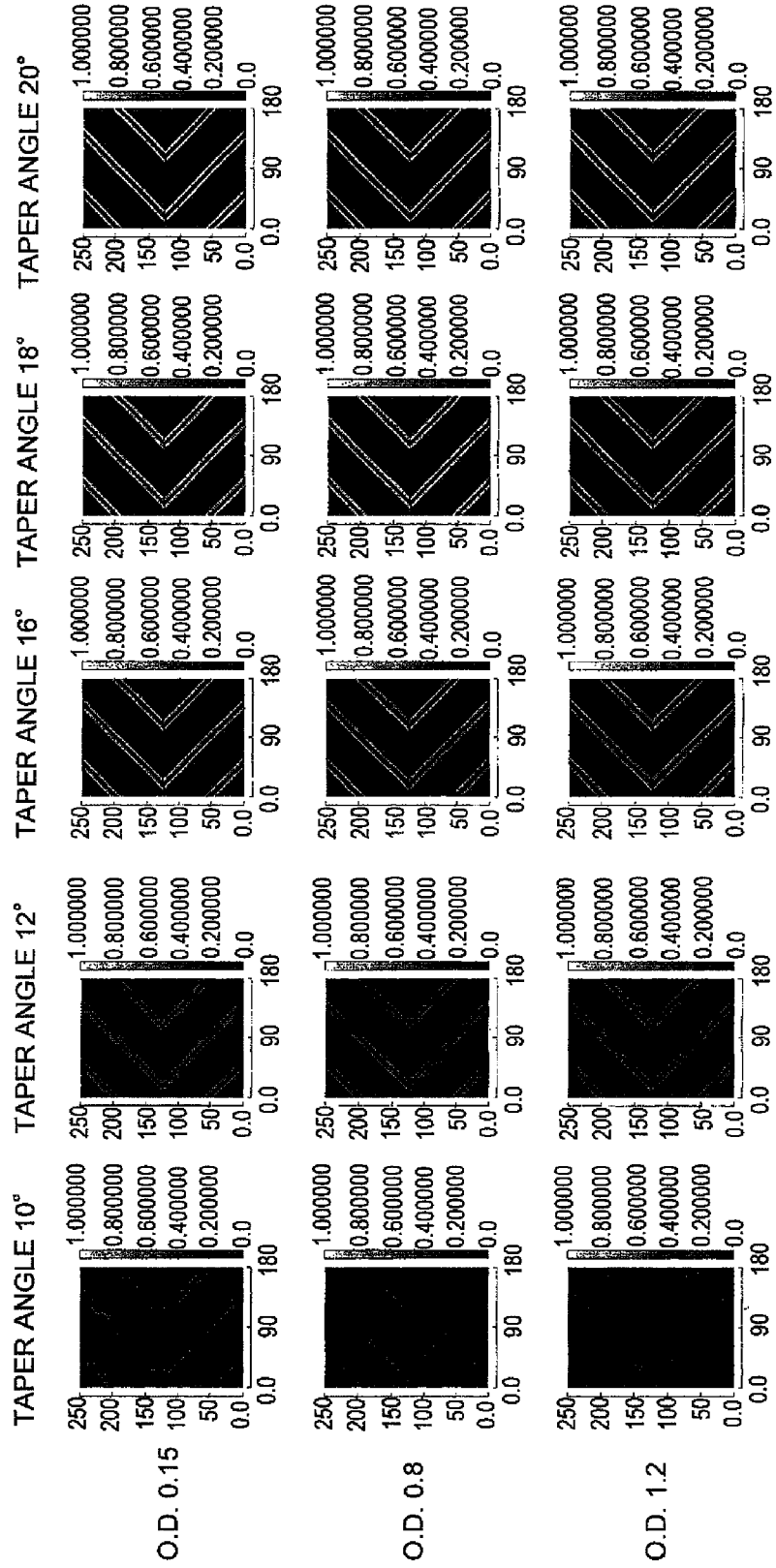
FIG. 4 A diagram showing simulation results of black displaying states of LCDs whose taper angles of ribs are different and whose OD values of materials composing the ribs are different.

FIG. 4 shows simulation results of black displaying states of LCDs whose taper angles of ribs and whose OD values of materials composing the ribs are different. The details of the simulation will be described later. It can be seen that the luminance at the side faces on both sides of a rib increases as the taper angle increases from 10°, 12°, 16°, 18°, to 20°. This is because of a non-zero retardation due to liquid crystal molecules which are oriented perpendicular to the side faces of the ribs. For, as the taper angle increases, the tilt angles of the liquid crystal molecules whose orientations are restricted at the side faces of the ribs will decrease (i.e., become closer to being parallel to the liquid crystal layer plane), thus increasing the retardation and transmittance.

On the other hand, there is a tendency in that the luminance at the side faces of the ribs decreases as the OD value of the material composing the ribs increases. This is because a portion of the light having been transmitted through large-retardation regions near the side faces of the ribs is absorbed by the ribs.

Figure 5:
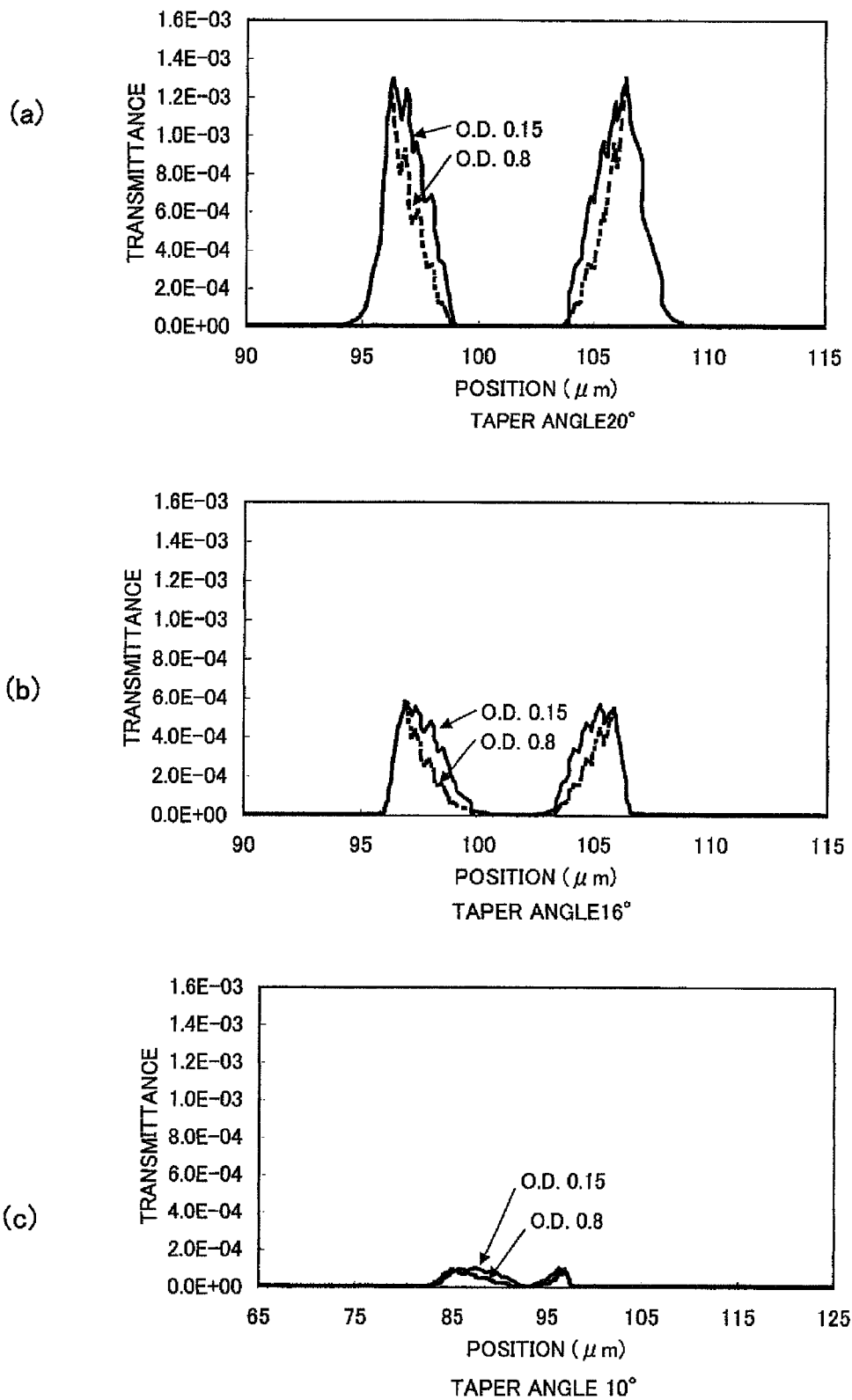
FIG. 5 A diagram showing transmittance distributions along a line which is orthogonal to an azimuth direction that ribs 21 extend, where: (a) illustrates the case where the taper angle is 20°; (b) illustrates the case where the taper angle is 16°; and (c) illustrates the case where the taper angle is 10°.

FIG. 5 shows transmittance distributions along a line that is orthogonal to the extending azimuth direction of the ribs 21. FIG. 5(a) represents the case where the taper angle is 20°; FIG. 5(b) represents the case where the taper angle is 16°; and FIG. 5(c) represents the case where the taper angle is 10°, illustrating the two kinds: ribs having an OD value of 0.15 (which may be referred to as "normal ribs"), and ribs having an OD value of 0.8 (light-shielding ribs).

As is clear from FIGS. 5(a) to (c), the transmittance (amount of light leakage from ribs) increases as the taper angle increases, and the transmittance decreases as the OD value increases.

A relationship between the taper angle of the ribs, the OD value, and the amount of light leakage (luminance) from ribs thus determined is shown in Table 1 and FIG. 6. As can be seen from FIG. 6, the amount of light leakage from ribs increases as the taper angle increases, and the amount of light leakage from ribs decreases as the OD value increases.

However, for a taper angle of 10°, a low and essentially constant value is exhibited without depending on the OD value. This is because orientation regulating forces due to the side faces of the ribs (the forces which tilt the liquid crystal molecules) are small. When the taper angle is on the order of 10°, the effects of providing the ribs may not be sufficiently exhibited. From the standpoint of orientation regulating force, it is preferable that the taper angle of the ribs is 12° or more. On the other hand, when the taper angle is 20° or more, there is a large light leakage amount, and the effects of suppressing leakage of light will be limited even if a rib material with an OD value of 1.2 is employed. Therefore, it is preferable that the taper angle of the ribs is no less than 12° and no more than 18°.

The OD value of the rib material is preferably 0.8 or more, which will provide an effect of suppressing leakage of light by about 20% or more relative to the rib material employed for the LCDs which the Applicants have been manufacturing and marketing (OD value: 0.15). Moreover, as can be seen from FIG. 6, when the OD value is 1.0 or more, the effect of suppressing leakage of light tends to be saturated. Although there is no particular upper limit to the OD value, it is preferable that the OD value is 1.2 or less for forming the ribs through a photolithography process. When the OD value is above 1.2, problems will occur such as lowering of the resolution in the photolithography process or a prolonged tact time. Of course no strict correspondence exists because the light used in the photolithography process is UV light whereas the aforementioned OD value is with respect to visible light; however, the aforementioned relationship is essentially true, according to the experience of the inventors.

Note that the evaluations of leakage of light due to the ribs which have been described with reference to FIG. 4 to FIG. 6 only concern light entering in a direction which is perpendicular to the display plane of the LCD, whereas the light which is emitted from a backlight that is actually used in an LCD has an angular distribution (see FIG. 9(b), for example), and there exists light which obliquely enters the liquid crystal layer.

Figure 8:
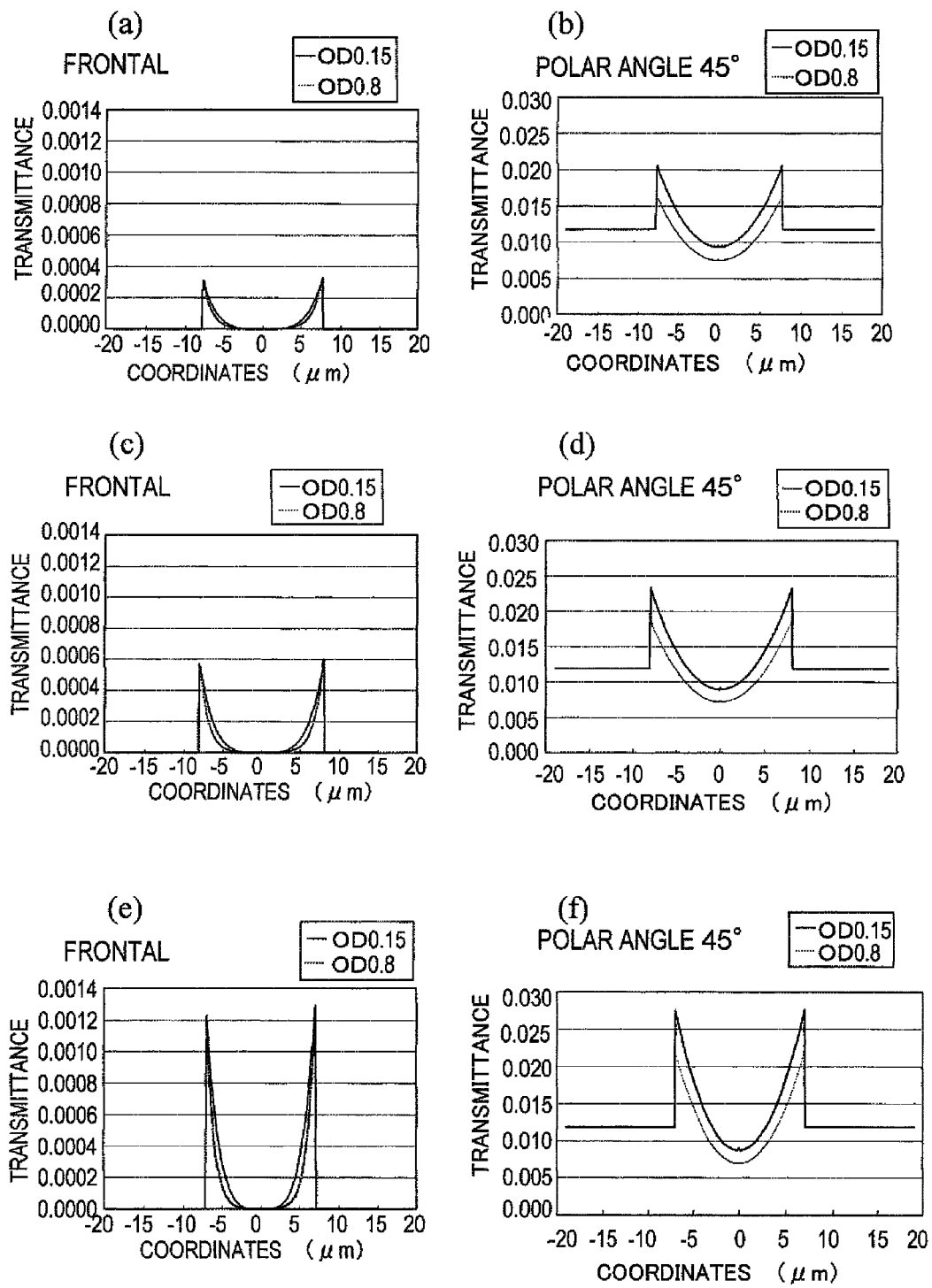
FIG. 8 Graphs, with respect to three kinds of ribs with different maximum taper angles, showing simulation results of a transmittance in the frontal direction and a transmittance in the direction of a 45° horizontal direction polar angle, where: (a) and (b) show results of a rib having a maximum taper angle of 12°; (c) and (d) show results of a rib having a maximum taper angle of 15°; and (e) and (f) show results of a rib having a maximum taper angle of 18°.

Next, with reference to FIG. 7 to FIG. 9, results of studying the influences of the OD value of the ribs with respect to light which obliquely enters the liquid crystal layer will be described.

First, an exemplary result of measuring a cross-sectional profile of a rib is shown in FIG. 7(a). FIG. 7(b) shows a taper angle as determined by differentiating the cross-sectional profile of (a).

The rib shown in FIG. 7(a) was formed by patterning a photosensitive resin layer with a thickness of 1.2 μm to a width of 11 μm through a photolithography process. As shown in FIG. 7(b), the taper angle of the rib changes with position, and takes the maximum value (hereinafter, "maximum taper angle") about 1 μm inside of the rib end. The reason for the flat feet of the cross-sectional profile as shown in FIG. 7(a) is the influence of an alignment film which is provided so as to cover the rib, and the rib end can be determined by extrapolating the cross-sectional profile. The maximum taper angle in FIG. 7(b) is 16.7°. Note that the maximum taper angle of the rib can be adjusted by adjusting the ratio between the thickness of the photosensitive resin layer (i.e., the height of the rib) and the width (thickness/width).

Some of the simulation results of leakage of light due to ribs, based on the actually-measured rib cross-sectional profile obtained in the above manner, are shown in FIGS. 8(a) to (f). FIGS. 8(a) to (f) are graphs showing simulation results of a transmittance when only the light emitted in the frontal direction is considered and a transmittance when only the light emitted in the 45° polar angle direction is considered, with respect to ribs having maximum taper angles of 12°, 15°, and 18°.

FIGS. 8(a) and (b) show results of a rib having a maximum taper angle of 12°; (c) and (d) show results of a rib having a maximum taper angle of 15°; (e) and (f) show results of a rib having a maximum taper angle of 18°; FIGS. 8(a), (c), and (e) show a transmittance of light which is emitted in the frontal direction; and FIGS. 8(b), (d), and (f) show a transmittance of light which is emitted in the 45° polar angle direction. The polar angle is 0° in the liquid crystal layer normal direction; herein, a polar angle when the azimuth direction (azimuth direction) is in a horizontal direction (3 o'clock-9 o'clock direction) is presented. Note that, in an MVA-type LCD which performs displaying in the normally black mode, a pair of polarizers are to be placed in crossed Nicols. The present evaluations are directed to a construction where the transmission axis (polarization axis) of one of the pair of polarizers is disposed in the horizontal direction on the display plane, whereas the transmission axis of the other is disposed in the vertical direction. In other words, the polar angle shown in FIGS. 8(b), (d), and (f) is a polar angle in an azimuth direction which is parallel to the transmission axis of one of the pair of polarizers.

From a comparison between FIGS. 8(a), (c), and (e), it can be seen that the transmittance of light which is emitted in the frontal direction increases as the maximum taper angle increases. It can also be seen that, in each case, the rib (OD=0.8) with the larger OD has a larger integral value of transmittance (area of the horn-like portions shown in the figure) than does the normal rib (OD=1.5). This is in accordance with the above description with reference to FIGS. 4 to 6.

Next, FIGS. 8(b), (d), and (f) will be referred to. Firstly, it should be noted that the transmittance of light which is emitted in the 45° polar angle direction is greater than the transmittance of light which is emitted in the frontal direction. The ratio of the transmittance at the polar angle 45° to the frontal transmittance is, based on a comparison of the respective maximum values (the values at the tips of the horns in the figure), about twenty-fold at a maximum taper angle of 18° from the comparison between FIG. 8(f) and FIG. 8(e), and as large as about seventy-fold at a maximum taper angle of 12° from the comparison between FIG. 8(b) and FIG. 8(a). Moreover, the leakage of light of obliquely-entering light increases as the maximum taper angle increases.

Now, attention will be paid to the integral values of light leakage amounts from two ribs of different OD values. As for the light leakage amounts (integral values) of light which enters in the frontal direction as shown in FIGS. 8(a), (c), and (e), there is no large difference between the normal rib having an OD value of 0.15 and the light-shielding rib having an OD value of 0.8. Moreover, since the absolute value of the leakage amount of light which enters in the frontal direction is small, the effect of employing light-shielding ribs will be limited.

On the other hand, as for the light leakage amounts (integral values) of light which enters in an oblique direction (polar angle 45° as shown in FIGS. 8(b), (d), and (f), there is a clear difference between the normal rib having an OD value of 0.15 and the light-shielding rib having an OD value of 0.8, indicative of the fact that use of light-shielding ribs will improve the black display quality at an oblique viewing angle.

FIG. 9(a) shows the viewing angle dependence of luminance in a black displaying state in an actual application to an MVA-type LCD. Herein, viewing angle is expressed as an angle from the display plane normal in the horizontal direction, as in the polar angle in FIG. 8. Herein, as a backlight, a direct type backlight having an angular distribution of outgoing light as shown in FIG. 9(b) was employed. Moreover, the frontal luminance of the MVA-type LCD in a white displaying state was adjusted to 500 cd/m².

The results for an MVA-type LCD having normal ribs with an OD value of 0.15, shown in FIG. 9(a), are measured values. Specifically, the light amount at each polar angle in the horizontal direction on the display plane of the LCD was measured by using EZ Contrast manufactured by ELDIM. Note that the normal ribs in the LCD used herein had a height of 1.2 μm and a width of 11 μm, with a maximum taper angle of about 16 degrees. The results for an MVA-type LCD having light-shielding ribs with an OD value of 0.8 shown in FIG. 9(b) are simulated.

As can be seen from FIG. 9(a), by using light-shielding ribs, the amount of light leakage (luminance) at oblique viewing angles can be reduced, and the black display quality at oblique viewing angles can be improved. Since the amount of light leakage at oblique viewing angles is as large as about 4 times the amount of light leakage at the frontal viewing angle (polar angle 0°), the black display quality can be significantly improved by reducing the light leakage amount by about 20% with the light-shielding ribs.

Moreover, by using light-shielding ribs, variations in the leakage of light due to ribs, i.e., variations from product to product with respect to the luminance in a black displaying state can be reduced. FIGS. 8(b), (d), and (f) will be again referred to.

As can be seen from FIGS. 8(b), (d), and (f), the transmittance of obliquely-entering light increases as the maximum taper angle increases. Therefore, if the maximum taper angle of the ribs varies due to variations in the process of rib formation and the like, the transmittance of obliquely-entering light will vary. Now, comparing the case of adopting normal ribs with an OD value of 0.15 and the case of adopting light-shielding ribs with an OD value of 0.8, as has been described earlier, the transmittance of obliquely-entering light will be smaller in the case of adopting light-shielding ribs. This will naturally result in smaller variations in the transmittance of obliquely-entering light associated with variations in the maximum taper angle of the ribs. Consequently, it is possible to reduce variations from product to product with respect to the luminance in a black displaying state, in particular the luminance in a black displaying state at oblique viewing angles.

TABLE 1

| OD value | taper angle 20° | taper angle 18° | taper angle 16° | taper angle 12° | taper angle 10° |
|---|---|---|---|---|---|
| 0.0 | 0.2062 | 0.1921 | 0.1173 | 0.0540 | 0.0263 |
| 0.15 | 0.1905 | 0.1770 | 0.1071 | 0.0486 | 0.0238 |
| 0.2 | 0.1855 | 0.1722 | 0.1042 | 0.0474 | 0.0235 |

TABLE 1-continued

| OD value | taper angle 20° | taper angle 18° | taper angle 16° | taper angle 12° | taper angle 10° |
|---|---|---|---|---|---|
| 0.4 | 0.1684 | 0.1506 | 0.0934 | 0.0423 | 0.0211 |
| 0.6 | 0.1551 | 0.1347 | 0.0851 | 0.0380 | 0.0193 |
| 0.8 | 0.1432 | 0.1211 | 0.0776 | 0.0344 | 0.0176 |
| 1.0 | 0.1330 | 0.1098 | 0.0715 | 0.0315 | 0.0161 |
| 1.2 | 0.1256 | 0.1022 | 0.0670 | 0.0292 | 0.0150 | amount of light leakage from ribs (unit: cd/m²)

[Simulation]

Figure 10:
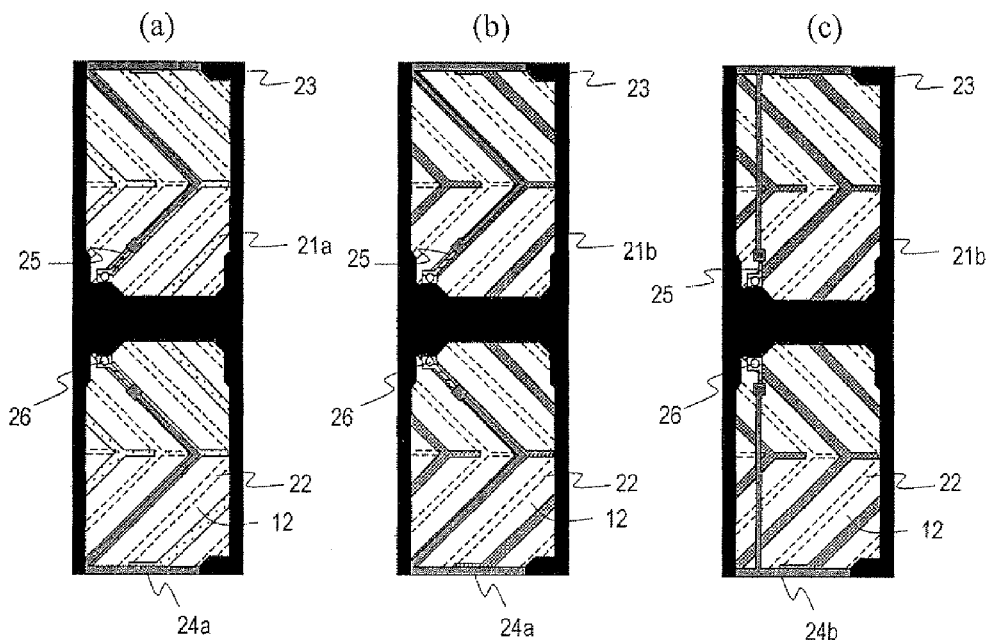
FIG. 10(a) to (c) are plan views schematically showing the constructions of pixel portions of LCDs used for a simulation, where: (a) is Reference Example; and (b) and (c) are Examples.

FIGS. 10(a) to (c) and Table 2 show constructions of LCDs which were used for the simulation. FIGS. 10(a) to (c) are plan views schematically showing the constructions of pixel portions of the LCDs used for the simulation. FIG. 10(a) is contemplated as a pixel portion of an LCD for a 37-inch WXGA-type liquid crystal television set (Reference Example), whereas FIGS. 10(b) and (c) are applications of the present invention thereto (Examples). The pixels have a pitch of 200 µm along the horizontal direction, and a pitch of 600 µm along the vertical direction. Also herein, those constituent elements which are common to FIG. 1 to FIG. 3 are denoted by like reference numerals, and the descriptions thereof are omitted.

Figure 11:
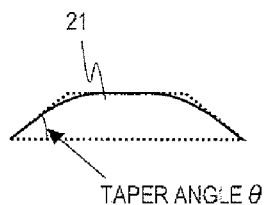
FIG. 11 A schematic diagram for describing the cross-sectional profile of a rib used for a simulation.

In all of the LCDs shown in FIGS. 10(a) to (c), a liquid crystal material with relative dielectric constants of $\in''=3.4$, $\in\perp1=6.5$, a relative dielectric anisotropy of $\Delta\in=-3.1$ (both being values at e.g. 1 kHz), and $K_{11}=14.2$ pN, $K_{33}=15.2$ pN, $\gamma1=127$ mPa·s was used as the liquid crystal material. The liquid crystal layer had a thickness of 3.4 µm. The simulation was performed with respect to various taper angles (θ), assuming that the ribs 21a (OD value=0.15) and 21b (OD value=0.8) had a trapezoidal cross-sectional profile as shown by a broken line in FIG. 11. Note that the ribs of the actually-prototype LCDs had a cross-sectional profile such that the upper corners of the trapezoid are rounded, as shown by a solid line in FIG. 11. However, it is near the edge portions of the rib that the leakage of light is largest, and the influences of differences in the shape of the upper portion of the trapezoid are not essential. The width of the ribs 21a and 21b (W1 in FIG. 3) was fixed to 11 µm; their height was fixed to 1.2 µm; and the width of the slits 22 (W2 in FIG. 3) was fixed to 7 µm. The width of the liquid crystal regions formed between the ribs 21a or 21b and the slits 22 (W3 in FIG. 3) was 22 µm.

In the LCDs shown in FIGS. 10(a) to (c), an inorganic insulating film (silicon nitride film) having a thickness of about 0.5 µm is used instead of the interlayer insulating film 52 shown in FIG. 2, and via this inorganic insulating film, a storage capacitor (CS) is formed in a portion where a pixel electrode 12 overlaps a portion of a storage capacitor line (hereinafter, CS line) 24a that extends within the pixel (hereinafter simply referred to as "an extended portion"). Moreover, the end portion of the extended portion of the CS line 24a opposes a drain lead line via the gate insulating film, thus forming a portion of the storage capacitor. As is well known, a storage capacitor is a capacitance which is in electrically parallel connection with a liquid crystal capacitor that is formed by the counter electrode 11/the liquid crystal layer 13/and the pixel electrode 12, and is a capacitance that retains a voltage (potential difference) at both ends of the liquid crystal capacitor. In the construction exemplified herein, the CS line 24a is composed of the same conductive layer as the gate bus line (not shown, present under the portion of a black matrix 23 that traverses the central portion of the pixel). A gate insulating film (not shown) covering them is formed, and a semiconductor layer composing a TFT is formed further thereupon, and a conductive layer composing a source electrode, a drain electrode, a source bus line, and a drain lead line is formed further thereupon (none of them is shown). On an insulating film covering them, the pixel electrode 12 composed of a transparent conductive layer (typically an ITO layer) is formed. The pixel electrode 12 is connected to the drain electrode of the TFT at a contact hole 26 provided in the insulating film. Similarly to the gate bus line, the TFT (not shown) is present under the portion of the black matrix 23 that traverses the central portion of the pixel. Note that the ribs 21a and the black matrix 23 are provided on the counter substrate 10a (see FIG. 2).

The LCD shown in FIG. 10(b) is obtained by replacing the ribs 21a in the LCD shown in FIG. 10(a), which are made of a material having an OD value of 0.15, with ribs 21b made of a material having an OD value of 0.8. Whereas the ribs 21a and 21b have a width of 11 µm, the wiring lines which are disposed so as to appear overlapping the ribs 21a or 21b when viewed from the normal direction of the liquid crystal layer (the extended portions of the CS lines 24 or the drain lead lines 25) have a width of e.g. 5 µm, thus being narrower than the width of the ribs 21a or the ribs 21b and being ½ or less of the width of the ribs 21a or the ribs 21b.

In the LCD shown in FIG. 10(c), the extended portions of the CS lines 24 and the drain lead lines 25 from the LCD shown in FIG. 10(b) are not provided so as to overlap the ribs 21b, but are disposed so as to constitute an angle of 45° with the ribs 21b, i.e., in an azimuth direction which is parallel or orthogonal to the transmission axes of the pair of polarizers which are placed in crossed Nicols.

TABLE 2

| | Construction 1 FIG. 10(a) | Construction 2 FIG. 10(a) | Construction 3 FIG. 10(b) | Construction 4 FIG. 10(c) |
|---|---|---|---|---|
| color filter | CF-A | CF-B | CF-B | CF-B |
| rib | R(0.15) | R(0.15) | R(0.8) | R(0.8) |
| wiring line | parallel to ribs | parallel to ribs | parallel to ribs | 45° against ribs |

Figure 12:
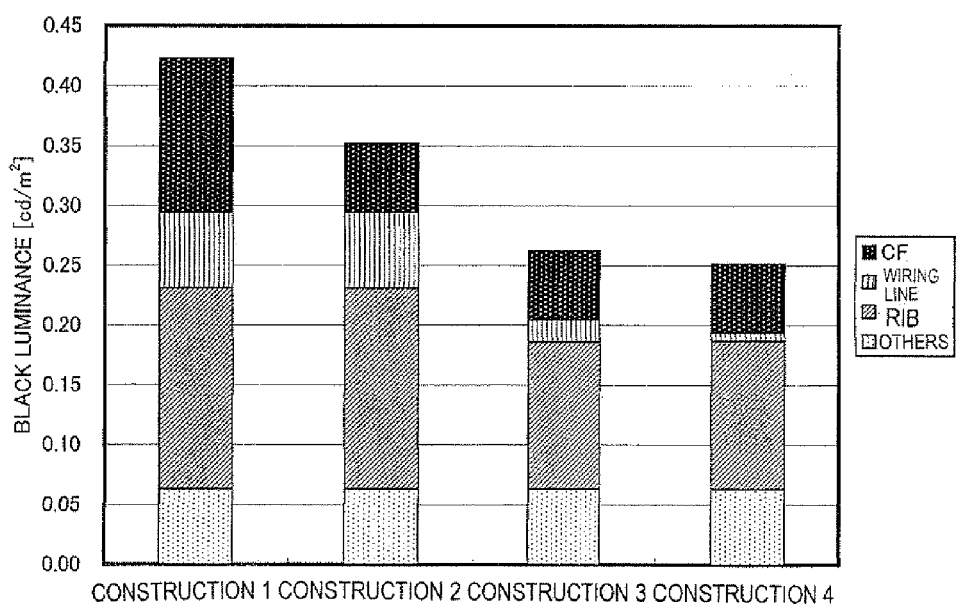
FIG. 12 A graph showing black luminances of Constructions 1 to 4 studied in a simulation.

With respect to the above-described constructions, black luminance was determined through a simulation using "Expert LCD" manufactured by DAVAN. The obtained results are shown in Table 3, Table 4, and FIG. 12 below, with respect to the respective factors (depolarization abilities of individual elements). Table 3 and FIG. 12 represent the case where the taper angle θ is 16°, and Table 4 represents the case where the taper angle θ is 18°.

Black luminance (cd/m²) was determined from eq. (1) below.

$$\text{black luminance} = \text{liquid crystal cell (CN)} \times [500/\{\text{mode efficiency} \times \text{liquid crystal cell (PN)}\}] \quad (1)$$

In eq. (1) above, "liquid crystal cell (CN)" represents a luminance in the case where a pair of polarizers sandwiching the liquid crystal cell are placed in crossed Nicols (CN), and "liquid crystal cell (PN)" represents a luminance in the case where a pair of polarizers sandwiching the liquid crystal cell are placed in parallel Nicols (PN). Moreover, "500" means 500 cd/m², which is the white luminance of the LCD. These luminances were determined through actual measurement. Measurement of luminance was performed by using a color luminance meter BM-5A manufactured by TOPCON, with a measured field of 2°. Moreover, "mode efficiency" represents white luminance/liquid crystal cell (PN) of the LCD, for which 0.72 was used as determined from measured values. A value which is obtained by dividing the white luminance value (=500) by the black luminance value thus determined is the contrast ratio (CR) of each LCD (CR=500/black luminance).

Moreover, depolarization abilities (degrees of depolarization) of "color filter", "ribs", and "wiring line" in Table 3 and Table 4 below were also determined from eq. (1) above. As for the depolarization ability of "color filter", the luminance on the right-hand side of eq. (1) was measured by employing a cell for color filter evaluation in which glycerin (pretending to be a liquid crystal layer) was sandwiched between a substrate having color filters formed thereon (having no ribs) and a separately-prepared glass substrate, instead of a "liquid crystal cell". Specifically, a black luminance corresponding to white luminance 500 cd/m$^2$ was determined by multiplying a value, which in itself was obtained through dividing the luminance of the cell for color filter evaluation (CN) by [mode efficiency×color filter substrate (PN)] (black luminance per white luminance 1 cd/m$^2$), by 500. As for the depolarization ability of "wiring line", similarly, the luminance on the right-hand side of eq. (1) was measured by employing a cell for wiring line evaluation in which glycerin (pretending to be a liquid crystal layer) was sandwiched between a TFT substrate having wiring lines formed thereon and a separately-prepared glass substrate, instead of a "liquid crystal cell". As for "ribs", the luminance on the right-hand side of eq. (1) was measured by employing a cell for rib evaluation in which a liquid crystal layer (thickness: 3.4 μm) was sandwiched between a rib substrate having only ribs formed on a glass substrate and a separately-prepared glass substrate, instead of a "liquid crystal cell". In this cell for rib evaluation, in order to obtain a vertical-alignment type liquid crystal layer, vertical alignment films were provided on both substrates. While glycerin was used in the evaluations of the depolarization abilities of "color filter" and "wiring line" in order to eliminate leakage of light due to the liquid crystal layer, in the evaluation of the depolarization ability of "ribs", the vertical-alignment type liquid crystal layer was employed in order to evaluate leakage of light due to the tilted orientations of liquid crystal molecules due to the ribs.

Although the calculation of black luminance was directed to light of a single wavelength of 550 nm, a good correlation with the measured values for green light (light transmitted through green color filters) was obtained for the prototyped LCDs. The results shown in FIG. 4 to FIG. 6 and Table 1 above are also based on this simulation, although a construction having no color filters was employed.

The black luminance of the color filters as determined from eq. (1) above contains a mode efficiency corresponding to the display mode of the LCD (herein, a mode efficiency of the MVA mode=0.72). A depolarization ability as unique characteristics of the color filters and unrelated to the mode of the LCD is defined by eq. (2) below.

depolarization ability=color filter (CN)−polarizer (CN)×[color filter (PN)/polarizer (PN)]     (2)

In the above, "color filter (CN)" represents a luminance in the case where a pair of polarizers sandwiching a color filter substrate are placed in crossed Nicols (CN), whereas "color filter (PN)" represents a luminance in the case where a pair of polarizers sandwiching a color filter substrate are placed in parallel Nicols (PN). Moreover, polarizer (CN) represents a luminance with only a pair of polarizers placed in crossed Nicols (CN), whereas polarizer (PN) represents a luminance with only a pair of polarizers placed in parallel Nicols (PN).

Values of the depolarization ability of the respective color filters as determined from eq. (2), as converted under the assumption that the luminance of polarizers placed in parallel Nicols (PN) (referred to as white luminance) was 500 cd/m$^2$ (referred to as "depolarization ability as converted to white luminance"), were 0.090 for CF-A and 0.048 for CF-B. The main reason why a color filter exhibits a depolarization ability is the scattering (or diffuse reflection) by the pigment (or dye) particles contained in the resin. By fine-graining the pigment (or dye) particles, e.g., so as to have an average particle size equal to or less than the wavelength of visible light, the depolarization ability as converted to white luminance can be made equal to or less than 0.05.

Main causes for the leakage of light due to wiring lines are diffraction and scattering at the edge portions of the wiring lines. As for the CS lines and drain lead lines, a two layer structure including an Al layer provided on a Ti layer was assumed, and diffraction and light scattering at the edge portions of the wiring lines were taken into consideration.

Other factors include light scattering at the edge portions of the pixel electrodes (ITO layer) and leakage of light from the polarizers placed in crossed Nicols. Although the details of the individual contributions of other factors are not necessarily clear, the values of "others" shown in Table 3 and Table 4 are considered reasonable based on the measurement results of black luminance of the prototyped LCDs.

TABLE 3

| | Construction 1 FIG. 10(a) | Construction 2 FIG. 10(a) | Construction 3 FIG. 10(b) | Construction 4 FIG. 10(c) |
|---|---|---|---|---|
| color filter | 0.128 | 0.058 | 0.058 | 0.058 |
| rib (θ = 16°) | 0.107 | 0.107 | 0.079 | 0.080 |
| wiring line | 0.064 | 0.064 | 0.019 | 0.007 |
| others | 0.063 | 0.063 | 0.063 | 0.063 |
| black luminance (total) | 0.362 | 0.291 | 0.218 | 0.207 |
| contrast ratio | 1382 | 1717 | 2293k | 2410 |

TABLE 4

| | Construction 1 FIG. 10(a) | Construction 2 FIG. 10(a) | Construction 3 FIG. 10(b) | Construction 4 FIG. 10(c) |
|---|---|---|---|---|
| color filter | 0.128 | 0.058 | 0.058 | 0.058 |
| rib (θ = 18°) | 0.168 | 0.168 | 0.123 | 0.124 |
| wiring line | 0.064 | 0.064 | 0.019 | 0.007 |
| others | 0.063 | 0.063 | 0.063 | 0.063 |
| black luminance (total) | 0.423 | 0.352 | 0.262 | 0.251 |
| contrast ratio | 1183 | 1420 | 1908 | 1988 |

As is clear from Table 3 and FIG. 12, and particularly from FIG. 12, leakages of light due to the color filters and the ribs are large factors in Construction 1. By replacing the color filters with those having a low depolarization ability, as shown in Construction 2, the black luminance is reduced by about 20%.

Furthermore, by replacing the ribs having an OD value of 0.15 to those having an OD value of 0.8, leakage of light due to the ribs is reduced and also leakage of light from the wiring line is reduced, whereby the black luminance is reduced by about 25%. This is because, as shown in FIG. 10(b), wiring lines with a narrower width than that of the ribs are disposed so as to overlap the ribs in Construction 3, whereby the scattered light generated at the edge portions of the wiring lines is absorbed by the ribs. This is in contrast to the conventional belief that it would be more advantageous, for blocking the leakage of light due to the ribs, to dispose wiring lines with a broader width than that of the ribs so as to overlap the ribs. The influence of the OD value on the leakage of light due to the ribs has been described with reference to FIG. 4; it will be seen that, in an actual LCD, disturbed polarized light which is generated due to other factors (e.g. scattered light) is absorbed by ribs which are made of a material having a high OD value, thus resulting in complex effects. Furthermore, as for the LCD in which the ribs have a taper angle θ of 18° as shown in Table 4, by looking at the effect of changing the OD value of the ribs from 0.15 to 0.8 (i.e., comparing Construction 2 and Construction 3), it will be seen that the black luminance is reduced by about 25%. Note that, in order to allow the scattered light from the edges of the wiring lines to be effectively absorbed by the ribs, the width of the ribs is preferably broader than the width of the wiring lines, and more preferably twice as broad or greater than that.

Next, when Construction 4 is adopted, where the wiring lines which were disposed so as to overlap the ribs in Constructions 1 to 3 are provided in a 45° azimuth direction with respect to the extending azimuth direction of the ribs, so as to be parallel or orthogonal to the polarization axes of the polarizers, leakage of light due to the wiring lines is reduced by 60% or more. When Construction 4 is adopted for an LCD having a taper angle θ of 16° as shown in Table 3 and FIG. 12, a contrast ratio near 2500 can be realized. Moreover, a contrast ratio near 2000 can also be obtained in an LCD having a taper angle θ of 18° as shown in Table 4.

Thus, by ensuring that the ribs of an MVA-type LCD have side faces whose taper angle in a cross section which is orthogonal to an azimuth direction that the ribs extend is 18° or less, and that the ribs are made of a material having an OD value (optical density) of 0.8 or more, it becomes possible to realize displaying with a contrast ratio of 2000 or even more.

Figure 13:
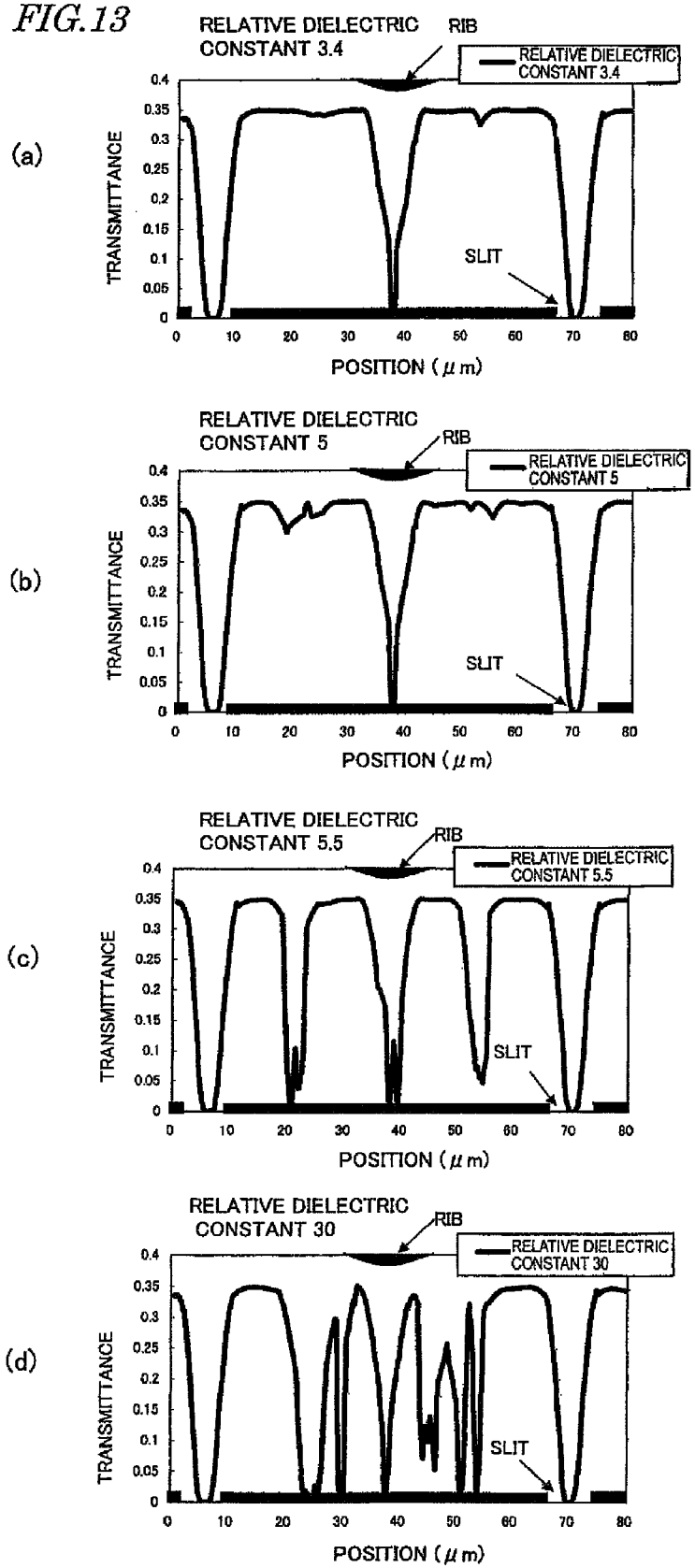
FIG. 13(a) to (d) are diagrams showing transmittance distributions of the LCD of Construction 3, in a direction which is orthogonal to an azimuth direction that ribs extend, showing transmittance distributions 10 ms after a white displaying voltage is applied across the liquid crystal layer in a black displaying state.

Note that a relative dielectric constant ∈ of the material of the ribs is preferably smaller than an average relative dielectric constant ($\in_{av}$) of the liquid crystal material, and more preferably equal to or less than 0.9 times $\in_{av}$. The reason will be described with reference to FIG. 13 and FIG. 14.

FIGS. 13(a) to (d) are diagrams showing transmittance distributions of an LCD of Construction 3 for which the aforementioned liquid crystal material (relative dielectric constant: ∈"=3.4, ∈⊥=6.5, $\in_{av}$=5.5) is used, along a direction which is orthogonal to the azimuth direction that the ribs extend, showing transmittance distributions 10 ms after a white displaying voltage is applied across the liquid crystal layer in a black displaying state. FIG. 13(a) illustrates the case where the ribs have a relative dielectric constant ∈=3.4; FIG. 13(b) illustrates ∈=5.0; FIG. 13(c) illustrates ∈=5.5; and FIG. 13(d) illustrates ∈=30. Herein, examples where the ribs have a taper angle of 18° are illustrated.

It will be seen that the transmittance in the regions between the ribs and the slits increase as the relative dielectric constant ∈ of the material of the ribs increases. Since the ribs are provided on the liquid crystal layer side of the counter electrode, the relative dielectric constant of the ribs affects any electric field which is generated in the liquid crystal layer. If the relative dielectric constant of the ribs is less than the relative dielectric constant of the liquid crystal layer, equipotential lines of an electric field which is generated in the liquid crystal layer will be bent in the opposite direction of the direction in which the ribs protrude (i.e., bent upward when the ribs 21 protrude downwards as shown in FIG. 2). Therefore, orientation regulating forces which are in the same directions as those of the orientation regulating forces due to the tilted side faces of the ribs will be applied by the electric field. Conversely, if the relative dielectric constant of the ribs is larger than the relative dielectric constant of the liquid crystal layer, the equipotential lines will be bent in the same direction as the direction in which the ribs protrude (i.e., bent downwards in the case illustrated in FIG. 2), and the degree of the bend will be steeper as the relative dielectric constant becomes larger. A liquid crystal molecule having a negative dielectric anisotropy will try to align so that the major axis of the molecule is parallel to the equipotential lines (so as to be orthogonal to the electric lines of force). Therefore, when the dielectric constant of the ribs is large, an electric field will apply orientation regulating forces in the opposite directions to the orientation directions of orientation regulating forces due to the tilted side faces of the ribs. If the orientation regulating force due to an electric field exceeds the orientation regulating forces due to the tilted side faces of the ribs, the orientation directions of the liquid crystal molecules near the ribs will no longer match the orientation directions of the liquid crystal molecules whose orientations are restricted by oblique electric fields of the slits, so that the liquid crystal molecules in the intermediate regions therebetween will not be able to stably fall in any direction, thus being aligned essentially vertically. As a result, as is clearly manifested in FIGS. 13(c) and (d), the transmittance in the intermediate regions between the ribs and the slits will decrease.

FIG. 14(a) is a graph showing the change over time of transmittance of a pixel after a white displaying voltage is applied across the liquid crystal layer in a black displaying state. FIG. 14(b) is a graph showing a relationship between the highest transmittance and the relative dielectric constant of the ribs.

As will be seen from FIGS. 14(a) and (b), when the relative dielectric constant of the ribs is 5, a high transmittance is exhibited as in the case where the relative dielectric constant is 3.4; however, the transmittance is decreased when the relative dielectric constant of the ribs is 5.5 or more. This indicates that the relative dielectric constant of the ribs is preferably less than 5.5 (the average relative dielectric constant $\in_{av}$=5.5 of the liquid crystal material), and more preferably equal to or less than 5 (=0.9 times $\in_{av}$).

As the material of the ribs, it is preferable to use a photosensitive resin while employing a photolithography process, but if carbon black is used as a pigment to be added to the photosensitive resin in order to increase the OD value to 0.8 or more, for example, a problem will occur in that the relative dielectric constant will be too large. Therefore, it is preferable to mix materials with relatively low dielectric constants that are used as pigments for color filters. When a red pigment and a blue pigment are mixed, an OD value of 0.8 or more will be obtained across a broad wavelength range of a visible light spectrum which is centered around green; therefore, it is preferable to use pigments of at least these two colors.

INDUSTRIAL APPLICABILITY

The present invention is broadly applicable to MVA-type LCDs directed to purposes which require high viewing angle characteristics, e.g., liquid crystal television sets.

The invention claimed is:

1. A liquid crystal display device comprising:
a plurality of pixels each including a first electrode, a second electrode opposing the first electrode, and a vertical-alignment type liquid crystal layer provided between the first electrode and the second electrode, wherein, each of the plurality of pixels includes:
a rib provided on the first electrode on the liquid crystal layer and a slit formed in the second electrode on the liquid crystal layer;

when a voltage is applied across the liquid crystal layer, a liquid crystal domain is formed such that an azimuth direction of tilting of liquid crystal molecules in a region between the rib and the slit is orthogonal to an azimuth direction that the rib and the slit extend;

the rib has a side face whose taper angle, at a location where the rib meets the first electrode, relative to a plane of a first substrate supporting the rib, in a cross section which is orthogonal to an azimuth direction that the rib extends, is 18° or less, and wherein the rib comprises a material such that a film of the material with a thickness corresponding to a height of the rib has an optical density (OD) value of 0.8 or more.

2. The liquid crystal display device of claim 1, wherein a relative dielectric constant $\in$ of said material is smaller than an average relative dielectric constant $\in_{av}$ of the liquid crystal layer.

3. The liquid crystal display device of claim 1, wherein the rib contains a blue pigment and a red pigment.

4. The liquid crystal display device of claim 1, comprising said first substrate having the first electrode, a second substrate having the second electrode, and a pair of polarizers placed in crossed Nicols, wherein the rib includes a first portion and a second portion extending in azimuth directions which are substantially 90° apart, each of the first portion and the second portion bisecting an angle between transmission axes of the pair of polarizers.

5. The liquid crystal display device of claim 4, wherein, the second substrate includes a wiring line in a region corresponding to each of the plurality of pixels, the wiring line being made of a material containing a metal; and the wiring line extends in an azimuth direction which is parallel or orthogonal to the transmission axes of the pair of polarizers.

6. The liquid crystal display device of claim 4, wherein, the second substrate includes a wiring line in a region corresponding to each of the plurality of pixels, the wiring line being made of a material containing a metal; and the wiring line is disposed so as to overlap the rib when viewed from a normal direction of the liquid crystal layer.

7. The liquid crystal display device of claim 6, wherein a width of the wiring line is narrower than a width of the rib.

8. The liquid crystal display device of claim 4, including a TFT connected to the second electrode and a storage capacitor, wherein, the wiring line is connected to a drain of the TFT or one of a plurality of electrodes constituting the storage capacitor.

9. The liquid crystal display device of claim 1, further comprising a color filter including pigment particles, wherein, a depolarization ability of the color filter is defined by the expression:

depolarization ability=color filter (CN)−polarizer (CN)× [color filter (PN)/polarizer (PN)] (where "color filter (CN)" represents a luminance when a pair of polarizers sandwiching a color filter substrate are placed in crossed Nicols (CN); "color filter (PN)" represents a luminance when a pair of polarizers sandwiching a color filter substrate are placed in parallel Nicols (PN); polarizer (CN) represents a luminance with only a pair of polarizers placed in crossed Nicols (CN); and polarizer (PN) represents a luminance with only a pair of polarizers placed in parallel Nicols (PN)); and a depolarization ability as converted to white luminance, which is a value of the depolarization ability as converted under an assumption that a luminance of a pair of polarizers placed in parallel Nicols is 500 cd/m$^2$, is 0.05 cd/m$^2$ or less.

10. The liquid crystal display device of claim 1, wherein said taper angle of the rib is 12-18 degrees.

* * * * *